B. B. HOTCHKISS.

PRIMERS FOR CARTRIDGES.

No. 7,394. Reissued Nov. 14, 1876.

Witnesses;

Geo. H. Graham.

B. B. Hill

Inventor;

B. B. Hotchkiss, by Munson & Philipp

Attorneys;

UNITED STATES PATENT OFFICE.

BENJAMIN B. HOTCHKISS, OF NEW YORK, N. Y.

IMPROVEMENT IN PRIMERS FOR CARTRIDGES.

Specification forming part of Letters Patent No. 99,899, dated February 15, 1870; reissue No. 7,394, dated November 14, 1876; application filed November 6, 1876.

*To all whom it may concern:*

Be it known that I, BENJAMIN B. HOTCHKISS, of New York city, in the State of New York, formerly a temporary resident of Vienna, Austria, and now temporarily residing in Paris, France, have invented certain new and useful Improvements in Primers for Cartridges; and I do hereby declare that the following is a full and exact description thereof.

In the accompanying drawings, which form a part of this specification, similar letters of reference indicate corresponding parts.

Figure 5:
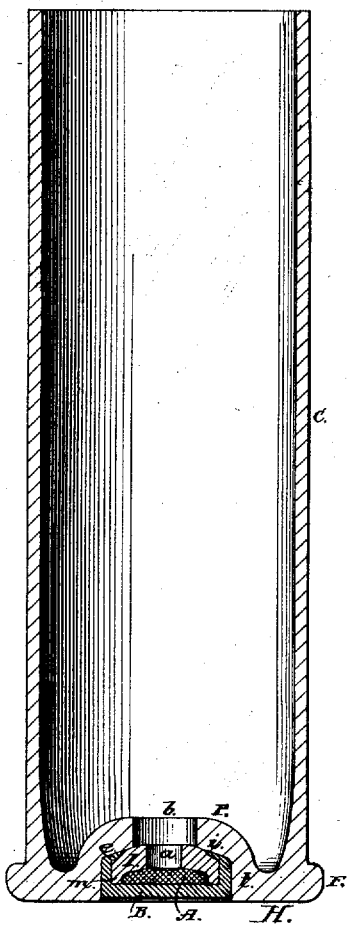
Figure 1:
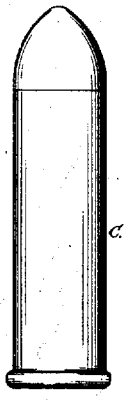
Figure 2:
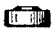
Figure 3:
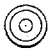
Figure 4:
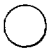
Figure 7:
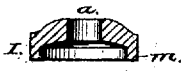
Figure 10:
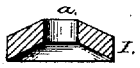
Figure 8:
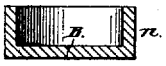
Figure 11:
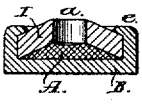
Figure 6:
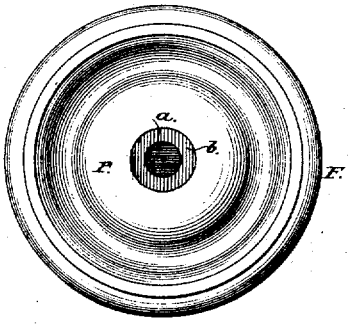
Figure 9:
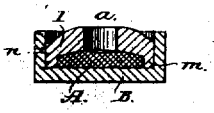
Figure 12:
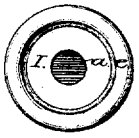

Figure 1 is a side elevation of the entire cartridge. Fig. 2 is a side elevation of the primer. Fig. 3 is a plan of the primer from the front. Fig. 4 is similar view of the primer from the rear. Fig. 5 is a longitudinal central section through the shell of the cartridge and through the primer, on an enlarged scale. Fig. 6 is a plan looking from the front rearward into the interior of the shell. Fig. 7 is a sectional view of the anvil. Fig. 8 is a sectional view of the cap. Fig. 9 is a sectional view of the parts constituting the primer, as loosely put together, previous to their being permanently united; Fig. 10, a sectional view of a modified form of anvil. Fig. 11 is a sectional view of the primer with its parts united together ready to be inserted into the cartridge; and Fig. 12 is a plan view of the front of the primer.

My invention relates to the means of exploding the charge of a cartridge adapted for breech-loading arms; and it consists in a percussion-primer of peculiar construction, adapted to be introduced into a central recess provided in the exterior of the head of a cartridge or shell, all of which is hereinafter particularly described.

The main elements of my primer are, an exploding-anvil, I, a patch or mass of fulminate, A, and an inclosing-cap, B, the said anvil and cap being permanently united together so as to inclose the fulminate between them.

The primer thus constructed is a complete article, adapted to be inserted into the base of a cartridge. The anvil I, after receiving a sufficient quantity of the fulminate, which may be attached to its inner and rear face, is placed within the cap B, in the position shown in Fig. 9, and then the edge of this cap is bent inward or drawn together and pressed down upon the anvil, so as to hold the parts permanently and tightly together, as is seen in Fig. 11. The fulminate may, of course, be attached to the inner surface of the cap B, or simply lie between said cap and the anvil.

The forming and putting together of the parts is accomplished by properly-adapted dies, and will offer no difficulty to mechanics accustomed to striking up copper and analogous soft metal.

I will now describe the arrangement of the primer in the cartridge. H is the base, of a copper or similar metallic cartridge-shell, provided with a flange, F, at its periphery, and with a long cylindrical casing, C, secured to the ball or shot at the other end in any approved manner. The central portion of the base of the cartridge is forced inward, so as to form a hollow projection, P, which is perforated centrally with a hole, *b*, and provides a recess in which the primer may be introduced. The primer will be firmly held in this recess with its exterior face nearly flush with the head of the cartridge, but sunk a little below it, the side walls *t* and the bottom surface or shoulder *i* sustaining it and preventing its being pressed inward too far. There is a hole, *a*, through the anvil I, which is in line with the hole *b* in the base of the cartridge-shell, thus providing a free passage of communication from the fulminate to the charge in the cartridge-shell. When the hammer strikes, either directly or through the aid of a firing-pin or analogous device, it acts not directly against the rear of the cartridge, but on the face or head of the cap B of the primer, and, indenting it inwardly, explodes the fulminate, the flame from which finds a direct and easy exit through the holes *a b* to the powder which is in the cartridge.

I prefer to construct the anvil I in the form represented in Figs. 5, 7, 9, so that there is a flange projecting from its edge rearward. In drawing together the front or edge of the cap B, I use such dies that the anvil I is not crushed, but is simply inclosed within the cap. The flange on the rear of the anvil I, which bears or seats itself upon the inner face of the cap, is marked *m*, and the greater cylindrical part of the front flange of the cap is marked *n*, and the contraction of the cap B, which is pressed down onto the anvil, and holds the anvil and cap together, is marked *e*.

In the act of being fired, the blow received on the rear face of the cap B is resisted not alone by the inertia of the anvil, but also by the base of the cartridge-shell, which base is formed of a heavy body of metal, stoutly connected to the case C of the cartridge-shell. The entire base of the cartridge-shell thus serves in effect as an anvil, resisting the blow which explodes the fulminate A.

The anvil I may, if preferred, be made considerably thicker than is here represented, or it may have simply a conical shape, omitting the cylindrical projection rearward, as is seen in Figs. 10 and 11. It will then, however, be less hollow, and capable of containing a smaller quantity of the fulminate. The thickness given to this anvil I of the primer may vary within wide limits. If it is thick and hard, it will more strongly contribute by its inertia and hardness to the explosion of the fulminate without subjecting the base of the cartridge-shell to any appreciable strain from the blow, but experiment has demonstrated that the anvil may be made very thin and light.

It will be observed that this construction of primer receives the great force due to the explosion of the fulminate entirely within its walls or casing, and that the jet of flame is directed through the holes *a* and *b* into the interior of the cartridge without subjecting the cartridge-shell to any action thereof. It follows that the cartridge-shell is not bent, cut, or abraded in the least by the action of the fulminate. In withstanding the explosion of the charge with which it is loaded, it is only required to resist the slower and more gentle action of the powder; and this latter, being exerted in a direction tending to compress, rather than distend, the base of the cartridge, does not seriously affect the structure during a great number of firings.

This combined primer and cartridge forms a most complete gas-check. At the period when the fulminate is burned, the parts of the primer are distended so as to fit more tightly that usual against the walls and shoulder of the recess within the base of the cartridge-shell. The construction described allows the primer to be very readily inserted into the recess in the base of the cartridge by any suitable tool, and allows it to be readily removed after the firing by the introduction of a wire or the like from the front, to act through the hole *a*.

This primer may be manufactured and transported as an article independent of the cartridge with which it is intended to be used, as it will bear a considerable pressure in the pocket, or when packed, without liability to distortion, because there is no thin edge left unsupported. Its parts are securely united together in such position as will insure its effective explosion when combined with a cartridge, as has been described. Much more of the material of the cap may be clinched down upon the anvil than is here represented; but it is important that the flange *e* thus clinched down shall be sufficient to hold the parts securely together and yet not wholly obstruct the hole *a* through the anvil, thus providing a clear passage for the flame to pass through into the interior of the cartridge-shell.

It is alone essential that sufficient metal shall be clinched over the anvil to hold the cap, fulminate, and anvil properly together, and that a clear passage of communication between the fulminate and the interior of the cartridge-shell shall be maintained.

Any ordinary means may be employed to render the primer water-proof. Each cap may be faced with a thin lamina of metal, as tin-foil, or with thin oiled or otherwise prepared paper, or the hole *a* may be closed by covering the inner face of the primer with a solution of shellac and alcohol or analogous material having such consistence as will leave a weak film across the hole *a* sufficient to exclude water, but so weak as to be readily broken by the flame, and to offer no appreciable resistance thereto when the primer is exploded.

The whole primer may be coated with shellac or any analogous waterproofing material, if desired; but in such case it may be well to produce the primer of a little less size than the recess in the base of the cartridge-shell, to allow for the coating of water-proof material on its exterior surface.

It will be observed that the construction of the interior of the anvil is such that a surface inclined toward the hole *a* is provided, whereby all the flame from the fulminate will be guided directly toward and through the holes *a* and *b*, and in a direction away from the walls of the recess in the base of the cartridge, which is thus effectually protected from the destructive action of the fulminate when it is exploded.

What, therefore, is claimed is—

1. A primer consisting of a cap and an anvil, permanently united together and inclosing the fulminate between them, substantially as described.

2. The within-described primer for cartridges, consisting of an internal anvil, I, and an external cap, B, permanently united together with the fulminate between them, and having a passage for the flame from the fulminate, substantially as described.

3. The combination of a cartridge having a recess in its base, and a perforation, *b*, through said base, with the compound primer, consisting of a cap and anvil permanently united so as to inclose the fulminate between them, and provided with a flame-passage communicating with the interior of the cartridge, substantially as described.

4. A primer consisting of a cap and an anvil, constructed with an interior surface inclined toward the flame-passage, substantially as described.

B. B. HOTCHKISS.

Witnesses:
H. T. MUNSON,
W. E. CHAFFEE.